United States Patent [19]

Pietrandrea et al.

[11] Patent Number: 5,557,874
[45] Date of Patent: Sep. 24, 1996

[54] MULTI-PURPOSE FISHING TOOL

[76] Inventors: Samuel J. Pietrandrea, 396 Beechwood Rd.; Albert A. Saviano, 278 McKinley Pl., both of Ridgewood, N.J. 07450

[21] Appl. No.: 257,174

[22] Filed: Jun. 9, 1994

[51] Int. Cl.⁶ .................................................. A01K 97/00
[52] U.S. Cl. ........................................ 43/4; 7/106; 289/17
[58] Field of Search ................... 43/1, 4, 53.5; 7/106, 7/125, 127, 129, 132; 81/328; 289/17; 606/144, 148

[56] References Cited

U.S. PATENT DOCUMENTS

| | | | |
|---|---|---|---|
| 3,965,605 | 6/1976 | Allen | 43/1 |
| 4,315,445 | 2/1982 | Catron | 43/1 |
| 4,392,494 | 7/1983 | Ashby | 606/144 X |
| 4,796,318 | 1/1989 | Bigej | 7/106 |
| 4,899,482 | 2/1990 | Gerdes | 43/4 |
| 5,207,012 | 5/1993 | Lael | 7/106 X |

FOREIGN PATENT DOCUMENTS

| | | | |
|---|---|---|---|
| 1021657 | 2/1953 | France | 7/127 |
| 479719 | 2/1938 | United Kingdom | 606/148 |

*Primary Examiner*—J. Elpel
*Attorney, Agent, or Firm*—Gregory Ferraro

[57] ABSTRACT

A modified hemostat adapted to be used as multi-purpose fishing tool has a gripping section, a fulcrum, handles and a knot-maker fixedly attached thereto. The handles are adapted to compress and open split-shot and to cut fishing line. The knot-maker is designed to facilitate tying knots which are specifically required for fly-fishing. The knot-maker includes a ramp, channel, and extendable head having eyelet evacuators.

12 Claims, 5 Drawing Sheets

MULTI-PURPOSE FISHING TOOL

FIELD OF THE INVENTION

The present invention relates to a multi-purpose fishing tool for use by a fisherman. In particular, the present invention relates to a fishing tool which combines many of the important tools required by fly-fishermen to facilitate the pursuit of fly-fishing. The multi-purpose fishing tool is adapted to be conveniently carried on the fisherman's vest such that it is easily accessible for use.

BACKGROUND OF THE INVENTION

Fly-fishing is a sport enjoyed by many people worldwide. In the United States alone 8 million people enjoy the sport of fly-fishing.

Fly-fishing involves the use of delicate and often highly complicated equipment. For instance, equipment required before fly-fishing includes a fly-rod, a reel with many reciprocating mechanical parts, several types of weighted and floating or sinking lines, an array of leader sizes, fly-fishing lures (hereinafter sometimes referred to as "flies", (both wet and dry), a net, various weights called split shots and a creel for carrying captured fish.

This equipment is often very delicate and must be in nearly perfect condition before fly-fishing is attempted, since any flaw in the equipment could prevent one from being successful. For example, a fly-rod has eyelets which guide a specifically designed fly-line, of specified size, along the length of the rod. The reel is usually comprised of many minute and delicate inter-acting mechanical parts which often need tending to by the fisherman. Further, many fly-fishing flies, have small eyelets for attachment to the fishing line. These eyelets often tend to become blocked by glue, dirt and other unwanted material, since many fly-fishermen make their own fly-fishing flies, this is often the case. The net is further comprised of thread and will need to be repaired occasionally as holes develop in the net due to the sharp spines of the fish. Accordingly, mechanical tools must be carried by the fly-fisherman while fishing, e.g., a conventional screwdriver and a "Phillips-type" screwdriver are among the tools needed.

Moreover, after a fish is hooked by a fisherman, the hook must be removed as gently as possible so as not to subject the fish to any unnecessary pain and to release the fish back into its natural environment which increases the survival rate of the fish. However, the hook is often deeply embedded in the fish and a hook extractor is needed_to minimize trauma to the fish. A hook extractor often encompasses a scissor-like implement with opposing surfaces at the tips so that the extractor can be inserted into the mouth of the fish to firmly grasp and remove the hook. A fish extractor is also used to remove the hook from vegetation, clothing, etc.

Since a fly-fisherman often fishes alone, there is also a requirement for a tool which will hold a grip to effectively achieve constant pressure and free the fisherman's hands to tend to other duties. An example of a tool which satisfies this requirement is a hemostat. A hemostat is a scissors-like device, however, there are opposed surfaces for gripping as opposed to cutting, and inter-locking teeth are provided to secure the hemostat in the closed pressure-applying position.

Scissors are also needed by a fly-fisherman for various jobs, such as cutting fishing line, trimming certain parts of the fly-fishing flies and leaders, etc. A fly-fisherman also needs split-shots attached to the fishing line near the fly-fishing lure to adjust the lure to the proper depth in the water, depending on factors such as water temperature, air temperature, and water current. Split-shot often are round and comprised of lead and are comprised of movable hemispheres for inserting the fishing line such that the split shot can be compressed around and fixedly attached to the fishing line. Split-shot used for fly-fishing is of varying sizes but is often smaller than that used for other types of fishing. Fly-fishermen, therefore, require a tool to compress the split-shot around the fishing line when they begin fishing and to reopen the split-shot for successive use after fishing.

Very importantly, many knots are required to be tied by the fishermen, for example, to tie the fishing line to the leader line. These knots are often complicated and difficult to tie, and they must be tied properly since they allow the fisherman to optimize the presentation of the fly on the water and to be assured that when a fish is hooked it will not be released by improperly-tied knots.

The backing part of the fishing line is the first line wrapped around the spool of the reel and is attached to the fishing line actually used for fishing and a leader is the part of the fishing line closest to the fly.

As mentioned previously, knots are needed at various crucial points in the fly fishing system. For example, a nail-knot is required when attaching the backing to the fly-line. Similarly, a nail-knot is needed to attach the butt end of the leader to the fly-line. Since many fly-fisherman build their own leaders, knots are needed in order to combine and repair various sections of the leader system. The flies are attached to the terminal section of the leader using a variety of knots, e.g. improved cinch, cinch, surgeons loop, blood knot, and the nail knot. The knot tying feature of the multi-purpose fishing tool of the present invention assists in tying these knots quickly and securely.

Accordingly, many different types of both mechanical and fishing tools are needed to constantly repair and fine-tune a fly-fisherman's equipment, and to assist a fly-fisherman with the line, lures, hooks and tying knots. The present inventors recognize the need for a device which consolidates all these required tools into one low-cost, compact, multi-purpose fishing tool. Many of these tools are well-known, however, carrying all of these tools when fishing is both cumbersome and impractical and leaves open the possibility of forgetting some important tools, which makes it more difficult to successfully fly-fish. The need for a compact, consolidated tool is further made necessary by the method of fly-fishing, where the fly-fisherman stands in the water, i.e., a river or a stream, up to the fly-fisherman's waist, or at least above the fisherman's knees. Accordingly, a fly-fisherman requires tools which are immediately accessible to him, since walking in and out of the water is time-consuming, uncomfortable and may distract the fish. Moreover, the tools must be placed in the fisherman's pocket or, preferably, suspended from his fishing vest since a fisherman is standing in the water and there is nowhere to rest any tools as is the usual case when one fishes from a boat or from land. The tool must be compact since a bulky tool hanging from the vest is impractical.

There have been many attempts in the past to provide a tool which is suitable for the fly-fisherman. However, these tools combine only some of the tools needed by the fly-fisherman.

Various types of fishhook extractors have been designed to remove the fishhooks from fish and unintentionally hooked items, e.g., birds, animals and vegetation.

Typical extractors are designed around long nosed scissors and "gun" models. Typical of plier designs are the extractors of U.S. Pat. Nos. 2,779,123 and 3,778,919. Both designs have the plier jaws holding the hook barb to the side by, respectively a groove arrangement and an anchoring plate.

A typical scissor arrangement is shown in U.S. Pat. No. 2,862,327 where the hook is held to the side by the clamping action of a "U" shaped tip against the other, longer tip. Typical "gun" type extractors are taught in U.S. Pat. Nos. 2,836,004 and 3,675,359. However, the problem with these devices is that they do not include many tools required such that a fly-fisherman must also carry with him many additional tools.

Various sizes and types of hemostats are also known, for example, U.S. Pat. No. 4,899,482 discloses a tool which is a modified basic hemostat design with handles in a clamping section. The hemostat comprises a hook retainer pin which eliminates the ability of the hemostat to slip off a hook during the extraction process. The hemostat may be used as a vice for various fishing activities, e.g., crimping split shot and a line scissors. However, this hemostat lacks many required tools required for fly-fishing, e.g., a knot-maker.

To date, no fishing tool has provided an incorporation of all the tools necessary for fly-fishing into one tool, as does the multi-purpose fishing tool of the present invention.

Accordingly, it is a primary object of the present invention to combine all the tools necessary for fly-fishing into one multi-purpose fishing tool.

It is another object of the present invention to provide a fishing tool having a knot-maker which can facilitate the tying of knots specifically needed for fly-fishing.

It is yet another object of the present invention to provide a tool which may be used to evacuate eyelets on fly-fishing lures.

It is also an object of the present invention to provide a fly-fishing tool which is of substantially simple and lightweight design and is inexpensive to manufacture.

It is yet another object of the present invention to provide a compact, light-weight and easy to handle multi-purpose fishing tool capable of being attached conveniently to a fisherman's vest.

A further object of the present invention is to provide a method of tying fly-fishing knots.

SUMMARY OF THE INVENTION

In accordance with the above-mentioned objectives and others, the multi-purpose fishing tool of the present invention comprises a modified hemostat having at least two opposite handles, finger loop means, a pivot point around which the handles move, a gripping means and a knot-maker fixedly attached to and extending rearward from either one of the handles.

In a preferred method, a multi-purpose fishing tool of the present invention is compact and is comprised of stainless steel and includes cutting means, and split-shot crimper and split-shot opener means. The handles preferably further comprise screwdriver means suitable for both a conventional and "Phillips-type" screw. In an alternate embodiment, serrated edges may be substituted for the cutting means.

In another preferred embodiment, the knot-maker of the multi-purpose fishing tool of the present invention further comprises a ramp having a channel extending therethrough for tying knots, and an retractable sleeve for gripping the fishing line to be tied.

In yet another preferred embodiment, the knot-maker of the multi-purpose fishing tool further includes eyelet evacuators attached to a head of the knot-maker for cleaning eyelets of fly-fishing flies and hooks and mounting means for securably attaching the multi-purpose fishing tool to a fisherman's vest.

In another embodiment, a casing is provided to provide a cover for the fishing tool to prevent staining of the tool and accidental injury to the fisherman, the casing has a hollow interior adapted to securely receive the multi-purpose fishing tool and further has a loop extending toward the top therefrom such that a fisherman may attach the multi-purpose fishing tool to a belt.

The present invention is also directed to a method for tying a fly-fishing knot for attaching a first line to a second line comprising rotating a first line around a ramp of the knotmaker, placing the tip of the second line in a channel, sliding the free end of the first line through the channel in an opposite direction with respect to that of the second line, removing the lines from the knot-maker, and securing the ends of the first and second lines to each other.

The present invention further relates to a method of attaching a hook or a lure to a fishing line comprising, sliding the end of the fishing line through an eyelet of the lure or hook, grasping the line back on itself forming a large loop with the fly at the end of the loop, passing the knot-maker through the center of the loop, rotating the knot-maker in a circle at least twice, pulling the retractable sleeve back, grasping the free end of the loop by releasing the retractable sleeve against the knot tying head to secure the end, pulling the knot-maker backwards through the loop, and applying tension to complete the knot.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
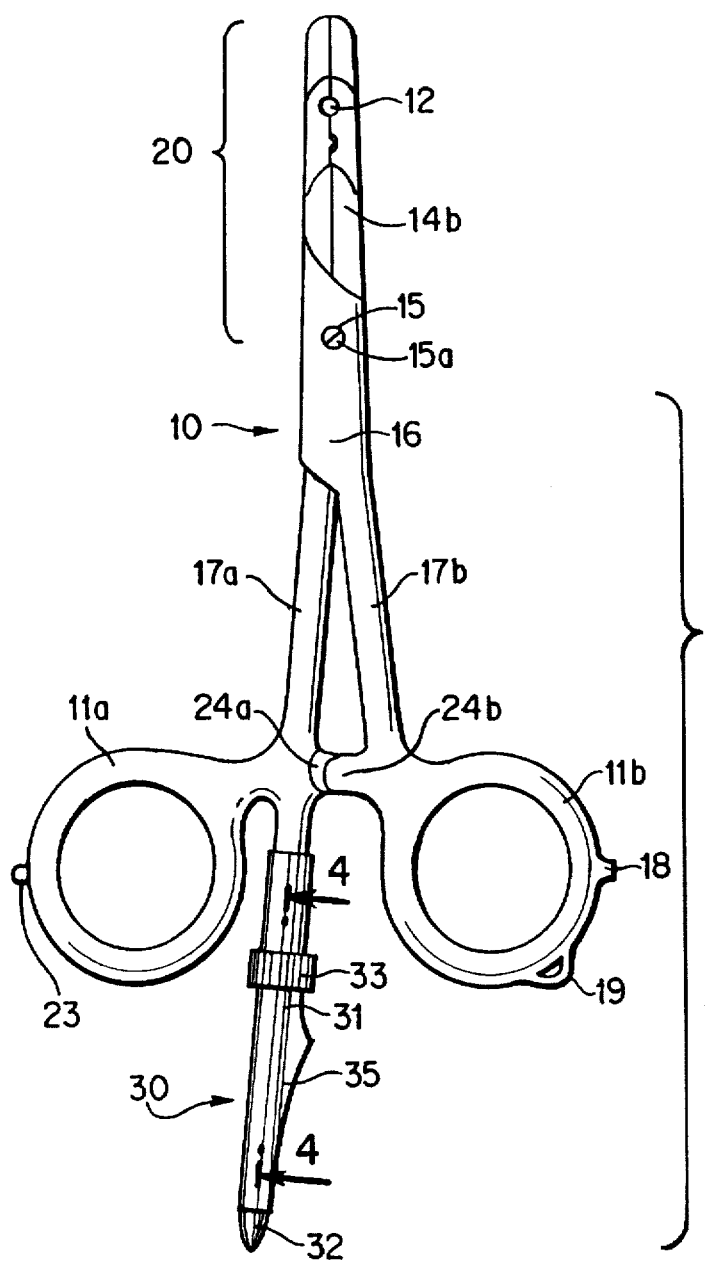
FIG. 1 is a top plan view of a preferred embodiment of the multi-purpose fishing tool of the present invention depicting the hemostat with the knot-maker attached to a handle member.

The fishing tool of FIG. 1 is a modified hemostat, generally indicated at 10, and is made up of first handle member 17a and second handle member 17b fixedly attached to each other for movement around a pivot point 15. The first handle member 17a and second handle member 17b are attached at a first flattened portion 16a and second flattened portion 16b via a screw 15a. The screw 15a acts as a fulcrum allowing inward pressure on first finger loop 11a and second finger loop 11b to apply an inward pressure towards a center line. A forward portion 20 of the multi-purpose fishing tool 10 is that portion in front of the pivot point 15 of the multi-purpose fishing tool 10. A rearward portion 26 of the multi-purpose fishing tool 10 is behind the pivot point 15. The first inter-locking toothed portion 24a and second inter-locking toothed portion 24b are located on the first handle member 17a and second handle member 17b, respectively, and interlock as pressure is applied toward the center line via first and second finger loops 11a and 11b. This configuration allows the multi-purpose fishing tool 10 to create constant pressure between a first serrated tip 21a and a second serrated tip 21b. As the first handle member 17a and second handle member 17b are moved toward a center line, the interlocking toothed portions 24a and 24b slide over each other and lock the first and second handle members 17a and 17b in a position to apply varying amounts of pressure. The multi-purpose fishing tool 10, therefore, acts as a vice to firmly hold an object. This action is extremely useful, since a fly-fisherman usually is alone while fishing. The first and second serrated tips 21a and 21b may also be used to remove the hook from a fish, clothing or vegetation by clamping the hook with the first and second serrated tips 21a and 21b, and then manipulating the multi-purpose fishing tool 10 while holding the fish with a free hand. This permits removal of the fish hook with minimal handling of the fish, which facilitates removal of the fish hook and causes less damage to the fish. This permits the fish to be released to its natural environment and increases its chances of survival.

Figure 2:
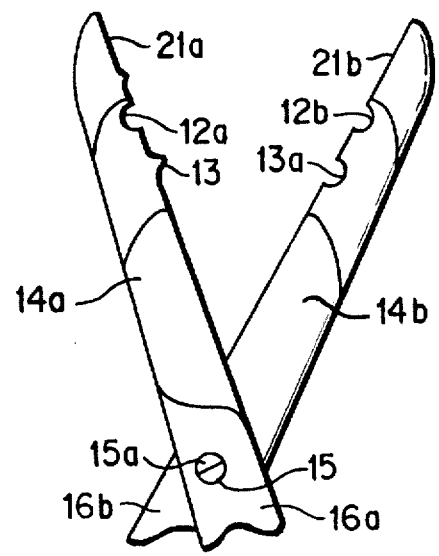
FIG. 2 is an enlarged elevational view of the forward portion of one embodiment of the multi-purpose fishing tool showing semi-circular cylindrical bores in the handles for compressing split-shot and a wedge for opening the split shot.

The serration of tips 21a and 21b of the multi-purpose fishing tool 10 are better shown in FIG. 2. The tips 21a and 21b are serrated to facilitate a better grip on an object, for example, to remove a hook from a fish. The tips 21a and 21b of the multi-purpose fishing tool 10 may also be curved (not shown). The shape of the serrated tips 21a and 21b of the forward portion 20 of the multi-purpose fishing tool 10 are a matter of preference to a fly-fisherman. Some fishermen prefer the curved tips for easier passage into a fish's stomach.

Also shown in FIG. 1 is a conventional slot-type screwdriver tip 18 extending from second finger loop 11b and PHILLIPS-type screwdriver tip 23 extending from first finger loop 11a. The screwdriver tips 18 and 23 are strategically placed for ease of use and can be used for repairing or maintaining the fly-fisherman's equipment by conveniently removing the multi-purpose fishing tool 10 from the fisherman's vest and rotating the multi-purpose fishing tool 10 such that screwdriver tips 18 or 23, whichever is needed, rotates to tighten or insert a screw.

Fixedly attached to the rear of the second finger loop 11b is a security ring 19. This is a simple machine loop and can be manufactured in either of the finger loops 11a or 11b. The security loop 19 allows the multi-purpose fishing tool 10 to be attached to the fisherman's vest for convenient storage by a snap or clip. Alternatively, the security loop 19 can be attached to a retractable holder, which can be extended so that work may be performed and the holder will then be pulled back into its position on the fisherman's vest.

FIG. 2 shows an enlargement of the forward portion 20 of the multi-purpose fishing tool 10 of the present invention. Symmetrical first and second semi-circular cylindrical bores 12a and 12b are aligned on first and second handle members 17a and 17b, respectively. As shown in FIG. 1, when inward pressure is applied on finger loops 11a and 11b, first and second semi-circular bores 12a and 12b combine to form a bore 12 through the forward portion 20 of the multi-purpose fishing tool 10 which conforms in size to split-shot preferably used by fly-fishermen.

Many tools are known for compressing split-shot around a fishing line are inappropriate for fly-fishing. Fly-fishing is very particular and split-shot used in other types of fishing have a larger circumference. Accordingly, a fly-fisherman often has to use his teeth to compress split-shot. The multi-purpose fishing tool 10 of the present invention alleviates this problem since bore 12 has a circumference which is specifically designed to accommodate split-shot used for fly-fishing.

FIG. 2 further shows wedge 13 and third semi-circular cylindrical bore 13a which are used cooperatively to open split-shot. Third semi-circular bore 13a has a size similar to that of semi-circular cylindrical bores 12a and 12b in that it tightly receives fly-fishing split-shot. Split-shot to be opened is held in third semi-circular cylindrical bore 13a and when pressure is applied on finger loops 11a and 11b, the wedge 13 applies pressure into a slot which divides the split-shot into first and second hemispheres and forces the split-shot open such that it can be removed from the fishing line and be therefore capable of reuse.

First cutting member 14a and second cutting member 14b are also located in the forward portion 20 of the multi-purpose fishing tool 10 on first and second handle members 17a and 17b, respectively (see FIG. 2). First and second cutting members 14a and 14b work in a fashion similar to an ordinary scissors. Fishing line or fishing leaders which are required to be cut by the fly-fisherman are simply placed between first and second cutting members 14a and 14b and pressure is applied on first and second finger loops 11a and 11b to snip the fishing leader or fishing line. Fly-fishing is very meticulous work and requires attention to detail. Fly lures at times are required to be cut since fly lures have thread attached thereto for the purpose of deceiving the fish. At times this thread needs to be cut while fishing and it may be cut with first and second cutting members 14a and 14b of the multi-purpose fishing tool 10.

Referring back to FIG. 1, a knot-maker 30 is shown fixedly attached to first handle member 17a. The knot-maker 30 comprises a ring 33 for slidably moving retractable sleeve 31. The knot-maker further has walls extending upward from the retractable sleeve 31 to form ramp 35. At an extreme end of the knot-maker 30 is head 32. The attachment of the knot-maker 30 to the first handle member 17a of the multi-purpose fishing tool 10 provides a combination of every tool required by a fly-fisherman while fly-fishing.

The knot-maker 30 may be attached to either of the first handle member 17a or second handle member 17b in a number of ways. The retractable sleeve 31 may be attached to either of the handle members 17a or 17b or the shaft 37 may be attached to the handle members 17a or 17b. The method of attachment may be via an over-locking flange, an ordinary machine screw or through the use of adhesives. Attachment may occur in the original manufacture of the device or after the hemostat component and knot-maker 30 are sold separately. Preferably, however, the multi-purpose fishing tool 10 is manufactured as one-piece with the knot-maker 30 as an integral component, as by welding and the like.

Figure 3:
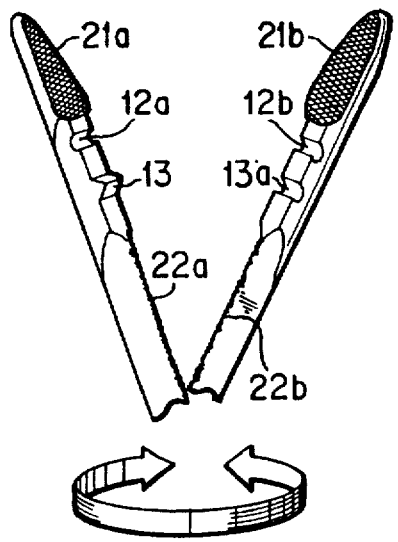
FIG. 3 shows an alternate embodiment of the fishing tool wherein the forward portion of the fishing tool is rotated 45° relative to that of FIG. 2 and shows the gripping means and a serrated edge along the tip of the handles.

FIG. 3 also depicts the forward portion 20 of the multi-purpose fishing tool 10, where the multi-purpose fishing tool 10 has been rotated to a 45° angle. FIG. 3 is an alternate embodiment of FIG. 2 wherein first and second cutting members 14a and 14b have been replaced with first and second serrated portions 22a and 22b. First serrated portion 22a and second serrated portion 22b can be used for gripping objects where the surface area of the first and second serrated tips 21a and 21b are too small. FIG. 3 further shows the wedge 13 and third semi-circular cylindrical bore 13a and first and second semi-circular cylindrical bores 12a and 12b which form bore 12. FIG. 3 further gives a better view of first and second serrated tips 21a and 21b in the forward portion 20 of the multi-purpose fishing tool 10.

Figure 4:
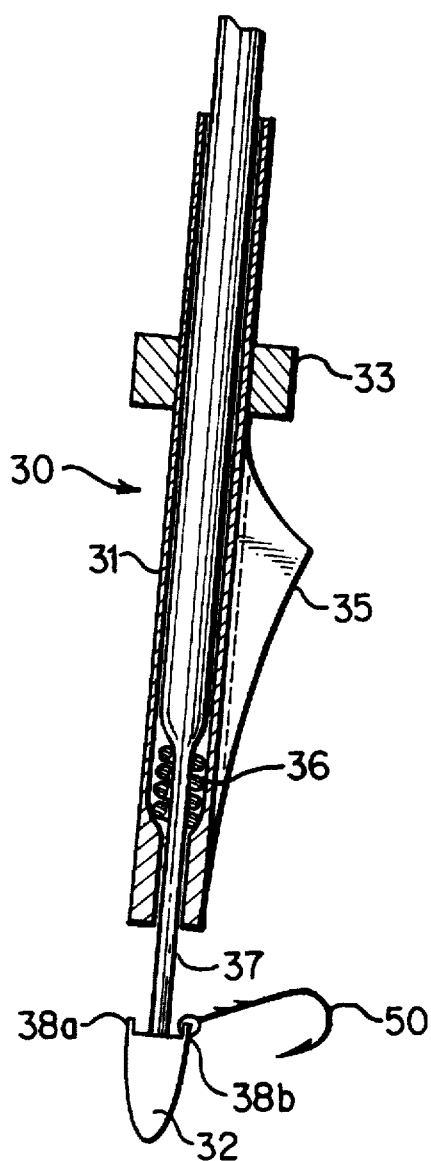
FIG. 4 is an enlarged fragmented sectional view taken along line 4—4 of FIG. 1 and shows a preferred embodiment of the present invention wherein the knot-maker includes a ramp, a channel and a retractable sleeve and a head having eyelet evacuators.
Figure 5:
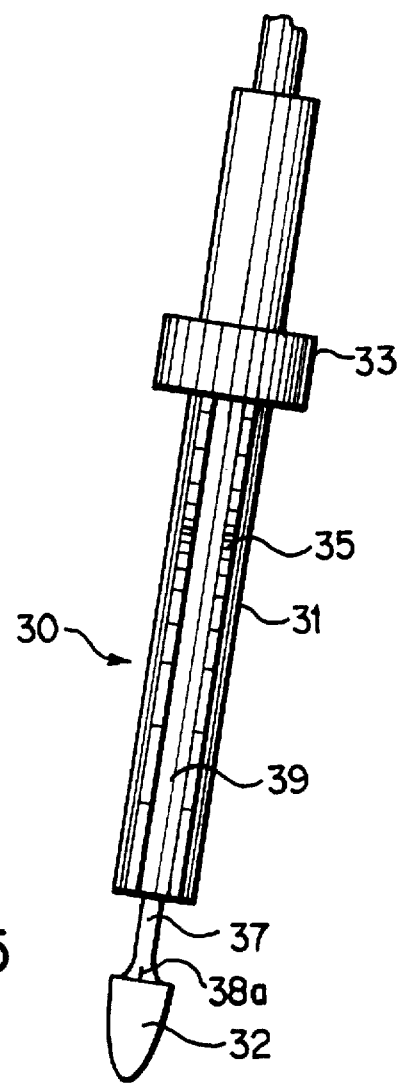
FIG. 5 is a top plan view of the knot-maker of the present invention with the retractable sleeve in the retracted position and the head having eyelet evacuators.

FIGS. 4 and 5 show an isolated view of the knot-maker 30 of the present invention, with FIG. 4 being a cross-sectional view. The knot-maker is comprised of retractable sleeve 31, ring 33, ramp 35 which defines channel 39 (see FIG. 5) and head 32. The retractable sleeve 31 moves in a forward and rearward direction along shaft 37. After retraction the retractable sleeve 31 is urged back into a rearward resting position via spring 36. Ring 33 is fixedly attached to retractable sleeve 31 to provide for easy manipulation of the retractable sleeve 31. In use, pressure is applied on the ring 33 on a forward direction to retract the retractable sleeve 31 in a forward direction along shaft 37 away from head 32. Release of the finger pressure allows the retractable sleeve 31 to return to its rearward resting position via the action of spring 36.

A fisherman who wishes to connect a fishing line to a fishing leader wraps the leader around a retractable sleeve 31 such that the leader is also wound around ramp 35. At this point the end of the leader may be inserted into the channel 39 (see FIG. 5) such that the leader is inserted through the channel back under its own wrappings. The tip of the fishing line is then inserted through the channel 39 in an opposite direction to that of the fishing leader. The lines are then slid off the knot-maker 30 and the tips of the fishing line and fishing leader are pulled in opposite directions to secure the line to the leader. This type of knot is referred to as a nail-knot in the fly-fishing art.

Alternatively, if the fisherman wishes to connect the fishing leader to either a fishhook 50 or a fly-fishing lure, the tip of the fishing line is slid through the eyelet of either the lure or hook and pressure is applied on the ring 33 to move retractable sleeve 31 away from head 32. Release of finger pressure allows retractable sleeve 31 to trap the tip of the fishing line between the retractable sleeve 31 and head 32. The fisherman is now free to wrap the fishing line around the portion of the fishing line opposite the eyelet to create an opening between the eyelet and the wrapping. The multi-purpose fishing tool 10 is then passed through the opening and the knot may be securely fastened by pulling on the tip of the fishing line.

FIG. 4 further shows eyelet evacuators 38a and 38b fixedly attached to head 32. Oftentimes while fishing, dirt, grime and other unwanted material will become lodged in the eyelet of a fishhook or a fishing lure. Further, glue is utilized during the process of making a fly-fishing lure and any excess glue may be caught in the eyelet and seal off the eyelet of the fly-fishing lure. Eyelet evacuators 38a and 38b are utilized by a fisherman by pulling the ring 33 to retract the retractable sleeve 31 away from head 32 such that eyelet evacuators 38a and 38b are exposed. An insertion of one of the eyelet evacuator 38a or 38b into the eyelet of the fishing hook 50 or a fly-fishing lure clears out the eyelet such that the tip of the fishing leader may now be passed through the eyelet of the fishing hook or fly-fishing lure to securely attach the fishing leader to the fish hook or fly-fishing lure.

FIG. 5 shows the knot-maker 30 of the present invention wherein the head 32 has eyelet evacuators 38a and 38b rotated 90° relative to the eyelets evacuators 38a and 38b of FIG. 4. The channel 39 of ramp 35 of knot-maker 30 is also depicted.

Figures 6, 7:
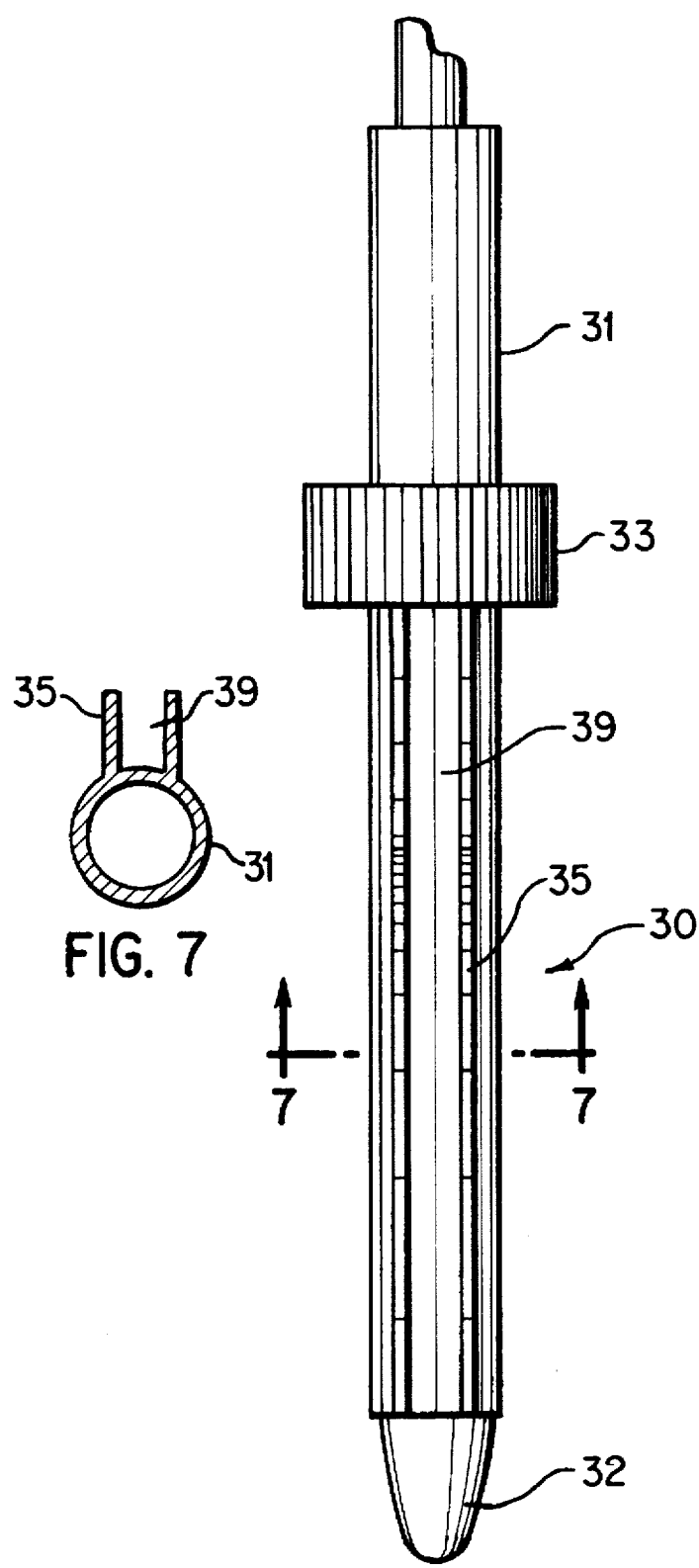
FIG. 6 is an enlarged view of FIG. 5.
FIG. 7 is a cross-sectional view taken along line 7—7 of FIG. 6 showing the channel and ramp of the knot-maker.
Figure 8:
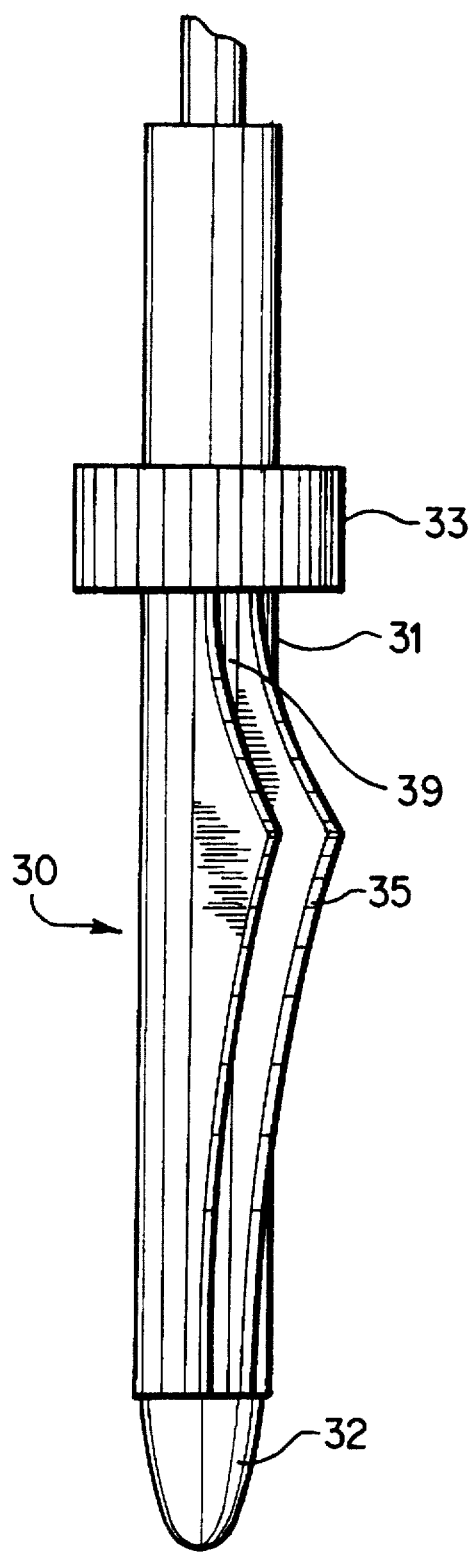
FIG. 8 is an enlarged 45° rotational view of the knot-maker of FIG. 5 displaying the channel and ramp.
Figure 9:
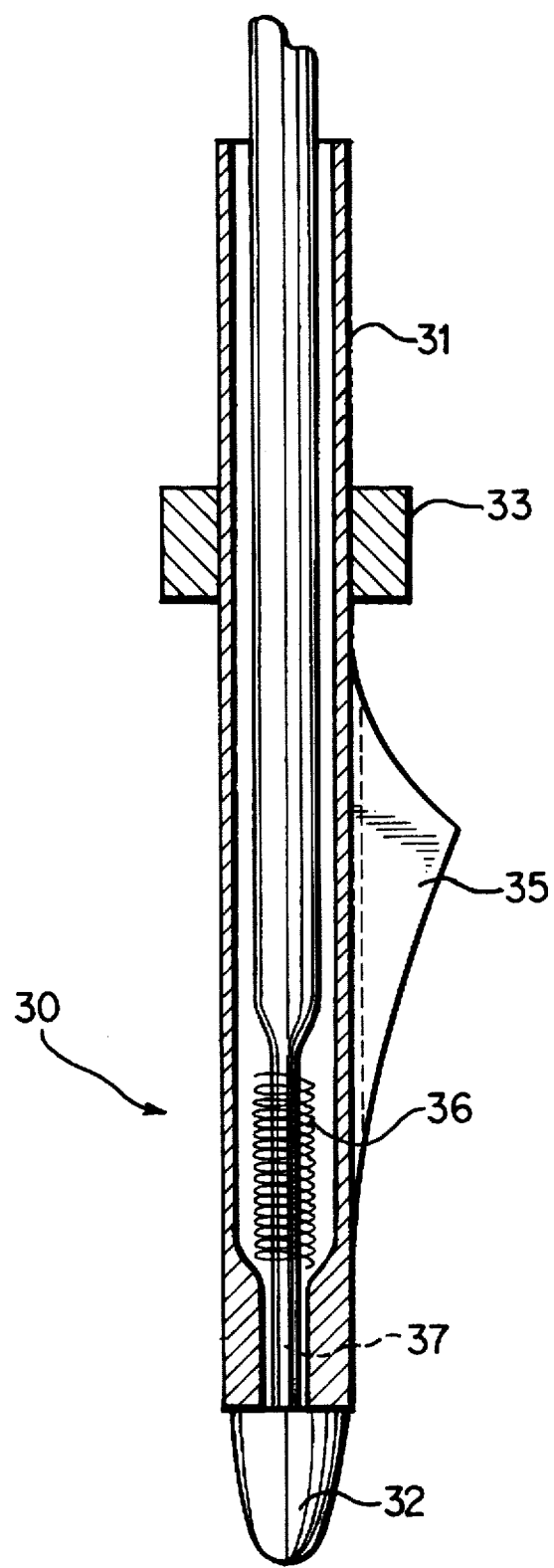
FIG. 9 is a cross-sectional view of the knot-maker with the retractable sleeve in the rearward resting position.

FIG. 6 is a cross-sectional view of the body 31 of the knot-maker 30 showing the ramp 35 and channel 39. FIG. 7 shows the knot-maker 30 with the retractable sleeve 31 in the rearward resting position. FIG. 8 is a view of the channel 39 created by the walls of the ramp 35. The knot-maker 30 is shown rotated 45° to better reveal channel 39.

It is to be understood that the specific embodiments disclosed are by way of illustration, and not limitation. Various modifications may be made by one of ordinary skill. The scope of the invention is as defined in the appended claims.

We claim:

1. A multi-purpose fishing tool including:

a hemostat having at least two handles, said handles inching finger loop means, a pivot point around which the handles move, wherein the handles each have a forward section and a rearward section relative to said pivot point, gripping means including opposed surfaces included along the forward section of the handles, and inter-locking toothed means, each of said forward section of said handles having a cutting member whereby said cutting members are aligned for cooperative action;

each of said forward section of said handles further comprising a semi-circular cylindrical bore adapted to compress split-shot and one of said handles further comprising at least one wedge and another of said handles comprises at least one corresponding semi-circular cylindrical bore for opening split-shot; and a knot-maker fixedly attached to .one of the handles, said knot-maker including a retractable sleeve having a pair of walls extending upward to form a ramp, said ramp defining a channel therein.

2. The multi-purpose fishing tool of claim 1 wherein the knot-maker is an integral part of one of the handles of the multi-purpose fishing tool and extends from said handle.

3. The multi-purpose fishing tool of claim 2 further comprising screwdriver means extending from the finger loop means.

4. The multi-purpose fishing tool of claim 3 further comprising a security ring for attaching the multi-purpose fishing tool to a fisherman's vest.

5. A multi-purpose fishing tool of claim 4 wherein the knot-maker further has a head, said head having a plurality of eyelet evacuators fixedly attached thereto.

6. The multi-purpose fishing tool of claim 5 wherein the knot-maker further comprises a shaft and a ring, wherein said ring is attached to the retractable sleeve for sliding the retractable sleeve along the shaft of the knot-maker.

7. The multi-purpose fishing tool of claim 6 wherein the shaft is integral with one of the handles and extends from said handle.

8. A multi-purpose fishing tool comprising:
- a hemostat having at least two handles, said handles including a first finger loop and a second finger loop, a pivot point around which the handles rotate, interlocking toothed means and gripping means, said gripping means including opposed surfaces included along a forward section of each of the handles;
- said finger loops having a Phillips-head screwdriver tip extending from one of said finger loops and a slot screwdriver tip extending from the opposite finger loop and one of said finger loops including a security ring;
- said handles comprising split-shot compressing means, split-shot opening means and cutting means on the forward sections thereof; and
- a knot-maker integral with one of said handles, said knot-maker comprising walls extending upward from a retractable sleeve to form a ramp, said ramp defining a channel therethrough, and a head having a plurality of eyelet evacuaters fixedly attached thereto.

9. The multi-purpose fishing tool of claim 8 comprising a first and second handle, wherein said split-shot compressing means comprises a first semi-circular cylindrical bore on the first handle and a second semi-circular cylindrical bore on the second handle, said split-shot opening means comprising a wedge on the first handle and a third semi-circular cylindrical bore on the second handle, said gripping means comprising a first serrated tip on the forward section of the first handle and a second serrated tip on the forward section of the second handle.

10. The multi-purpose fishing tool of claim 9 wherein said knot-maker further comprises a spring for urging the retractable sleeve into a resting position.

11. The multi-purpose fishing tool of claim 10 wherein said eyelet evacuators are attached to the head of the knot-maker such that when the retractable sleeve is in a resting position, the eyelet evacuated evacuators are disposed within the retractable sleeve.

12. A multi-purpose fishing tool comprising:
- a hemostat having at least two handles, said handles including finger loop means, a pivot point around which the handles move, wherein the handles each have a forward section and a rearward section relative to said pivot point, gripping means including opposed surfaces included along the forward section of the handles, and inter-locking toothed means, each of said forward section of said handles having a serrated edge whereby said serrated edges are aligned for cooperative action;
- each of said forward section of said handles further comprising a semi-circular cylindrical bore adapted to compress split-shot and one of said handles further comprising at least one wedge and another of said handles comprises at least one corresponding semi-circular cylindrical bore for opening split-shot; and
- a knot-maker fixedly attached to one of the handles, said knot-maker including a retractable sleeve having a pair of walls extending upward to form a ramp, said ramp defining a channel therein.

* * * * *

UNITED STATES PATENT AND TRADEMARK OFFICE
CERTIFICATE OF CORRECTION

PATENT NO. : 5,557,874
DATED : September 24, 1996
INVENTOR(S) : Pietrandrea, et al.

It is certified that error appears in the above-indentified patent and that said Letters Patent is hereby corrected as shown below:

Col. 8, line 30, Claim 1, line 1, "including" should read --comprising--;
Col. 8, line 32, Claim 1, line 3, "inching" should read --including--;
Col. 8, line 47, Claim 1, line 18, ".one" should read --one--.
Col. 9, line 11, Claim 8, line 8, "Phillips" should read --PHILLIPS--;
Col. 9, line 22, Claim 8, line 19, "evacuaters" should read --evacuators--.
Col. 10, line 7, claim 11, line 4, "evacuated" should be deleted.

Signed and Sealed this

Tenth Day of December, 1996

Attest:

BRUCE LEHMAN

Attesting Officer

Commissioner of Patents and Trademarks